US012692929B2

(12) United States Patent     (10) Patent No.:   US 12,692,929 B2

Foster et al.     (45) Date of Patent:   *Jul. 28, 2026

(54) LINEAR DRIVE ASSEMBLY

(71) Applicant: Kerr Machine Co., Sulphur, OK (US)

(72) Inventors: Kelcy Jake Foster, Sulphur, OK (US);
Micheal Cole Thomas, Azle, TX (US);
Christopher Todd Barnett, Stratford,
OK (US); Nicholas Son, Davis, OK
(US); John Keith, Ardmore, OK (US)

(73) Assignee: Kerr Machine Co., Sulphur, OK (US)

( * ) Notice: Subject to any disclaimer, the term of this
patent is extended or adjusted under 35
U.S.C. 154(b) by 19 days.

This patent is subject to a terminal dis-
claimer.

(21) Appl. No.: 19/200,031

(22) Filed: May 6, 2025

(65) Prior Publication Data

US 2025/0264151 A1    Aug. 21, 2025

Related U.S. Application Data

(63) Continuation of application No. 18/765,766, filed on
Jul. 8, 2024, now Pat. No. 12,320,409.

(60) Provisional application No. 63/513,501, filed on Jul.
13, 2023.

(51) Int. Cl.

| | |
|---|---|
| *F16H 21/28* | (2006.01) |
| *F04B 53/14* | (2006.01) |
| *F16C 5/00* | (2006.01) |
| *F16C 33/10* | (2006.01) |
| *F16H 57/01* | (2012.01) |
| *F16H 57/04* | (2010.01) |

(52) U.S. Cl.
CPC ........... *F16H 21/28* (2013.01); *F04B 53/146*
(2013.01); *F16C 5/00* (2013.01); ***F16C
33/1055* (2013.01); *F16C 33/1065*** (2013.01);
*F16C 33/108* (2013.01); *F16H 57/01*
(2013.01); *F16H 57/042* (2013.01)

(58) Field of Classification Search
CPC ...... F04B 53/146; F16C 5/00; F16C 33/1055;
F16C 33/1065; F16C 33/108; F16H
21/28; F16H 57/01; F16H 57/042
See application file for complete search history.

(56) References Cited

U.S. PATENT DOCUMENTS

| | | | | | |
|---|---|---|---|---|---|
| 5,031,512 | A | * | 7/1991 | Graziani | .................. F16C 5/00 74/44 |
| 7,032,690 | B2 | * | 4/2006 | Ramey | .................. E21B 19/24 175/57 |

(Continued)

*Primary Examiner* — Matthew Wiblin

(74) *Attorney, Agent, or Firm* — Tomlinson McKinstry,
P.C.

(57) ABSTRACT

A pair of wear grooves for a linear drive assembly. One wear
groove is disposed on a wear plate attached to a crosshead.
This wear groove is on a front edge of the wear plate, and
does not intersect any lubrication groove. Another wear
groove is disposed circumferentially about an inner wall of
a crosshead guide. Each of the wear grooves is observable
to an operator without fully disassembling the crosshead and
the crosshead guide, and each is observable from a single
side of the crosshead guide. Should the wear groove not be
observable, the associated component should be replaced.
Should the wear groove be observable, the remaining life of
the component can be determined from the groove's depth.

17 Claims, 8 Drawing Sheets

(56) References Cited

U.S. PATENT DOCUMENTS

| | | | | |
|---|---|---|---|---|
| 2008/0006148 | A1* | 1/2008 | McKelroy | ............ F04B 53/144 |
| | | | | 92/190 |
| 2018/0193895 | A1* | 7/2018 | Johnson | ................. F16C 29/02 |
| 2023/0213065 | A1* | 7/2023 | Zhang | .................... F04B 53/14 |
| | | | | 384/13 |

* cited by examiner

106

1

LINEAR DRIVE ASSEMBLY

SUMMARY

The present invention is directed to a linear drive assembly. The linear drive assembly comprises a crosshead and a pair of wear plates. The crosshead is configured to be installed within a crosshead guide and comprises upper and lower surfaces. The pair of wear plates are removably attached to a corresponding one of the upper and lower surface of the crosshead. Each wear plate has an outer surface and a front edge. Each plate has at least one lubricant groove and at least one plate wear groove. The at least one lubricant groove is formed in the outer surface of the wear plate and is in fluid communication with lubricant ports formed in the crosshead. The at least one plate wear groove is formed in the outer surface of the wear plate and is distinct from the at least one lubricant groove. The at least one wear plate groove is not in fluid communication with any lubricant port formed in the crosshead. The at least one wear plate groove opens on the front edge of the wear plate.

In another aspect, the invention is directed to a kit. The kit comprises a crosshead guide, a linear drive assembly, and a first wear plate. The crosshead guide has a longitudinal bore formed therein. The linear drive assembly is configured to be installed within the longitudinal bore of the crosshead guide. The linear drive assembly comprises upper and lower surfaces and defines a lubricant channel in the upper surface and the lower surface.

The first wear plate is configured for removable attachment to the upper surface of the linear drive assembly. The first wear plate is defined by an inner surface conforming to the upper surface of the linear drive assembly, an outer surface, and a front edge. At least one lubricant groove is formed within the outer surface of the first wear plate. A lubricant port interconnects the inner surface to the outer surface and intersects the at least one lubricant groove. The at least one wear groove is formed in the outer surface of the first wear plate and is distinct from the at least one lubricant groove.

DETAILED DESCRIPTION

Turning now to FIGS. 1-11, one embodiment of a high-pressure pump 100 is shown. The high-pressure pump 100

Figure 1:
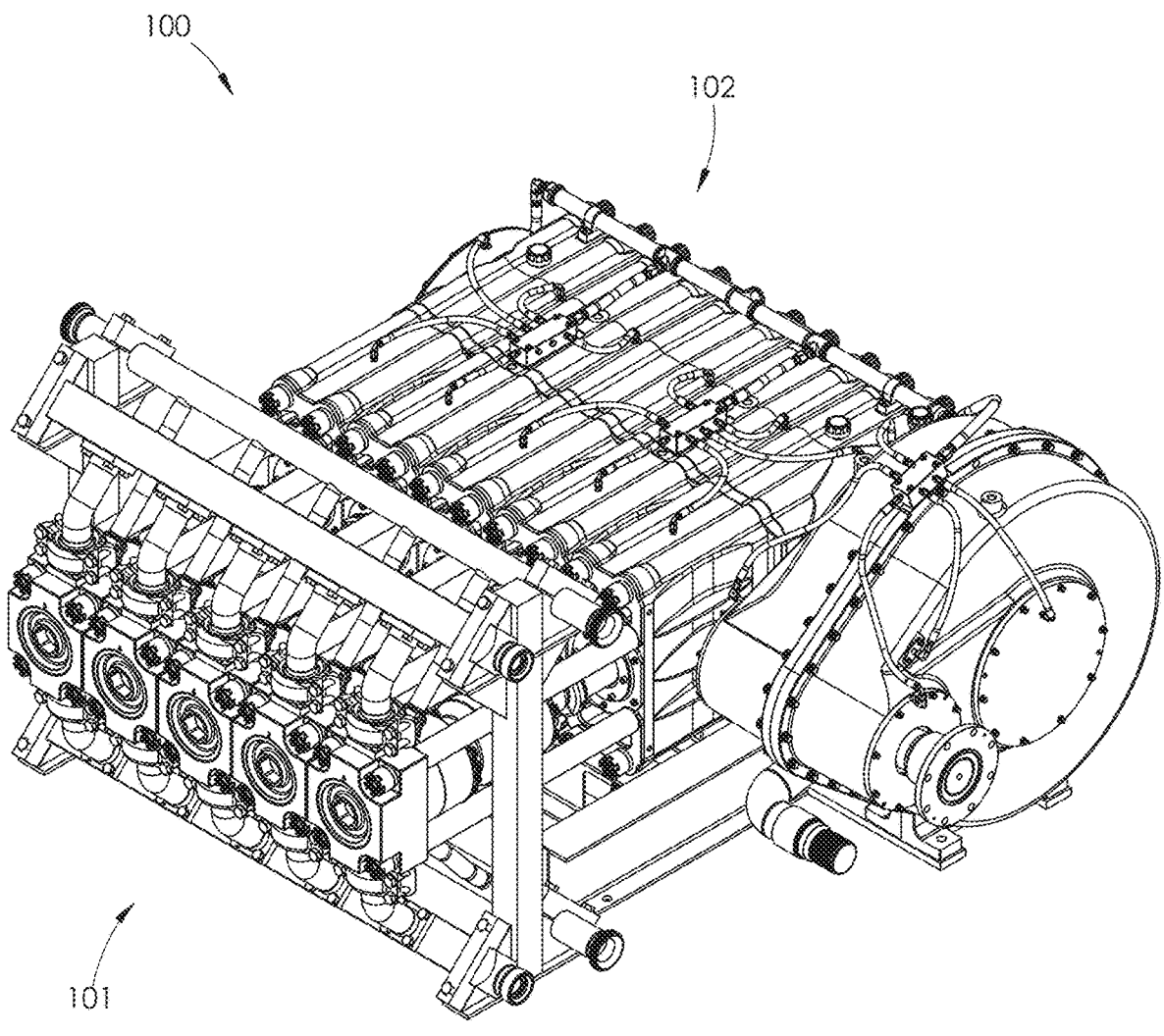
FIG. 1 is a front perspective view of one embodiment of a high-pressure pump.
Figure 2:
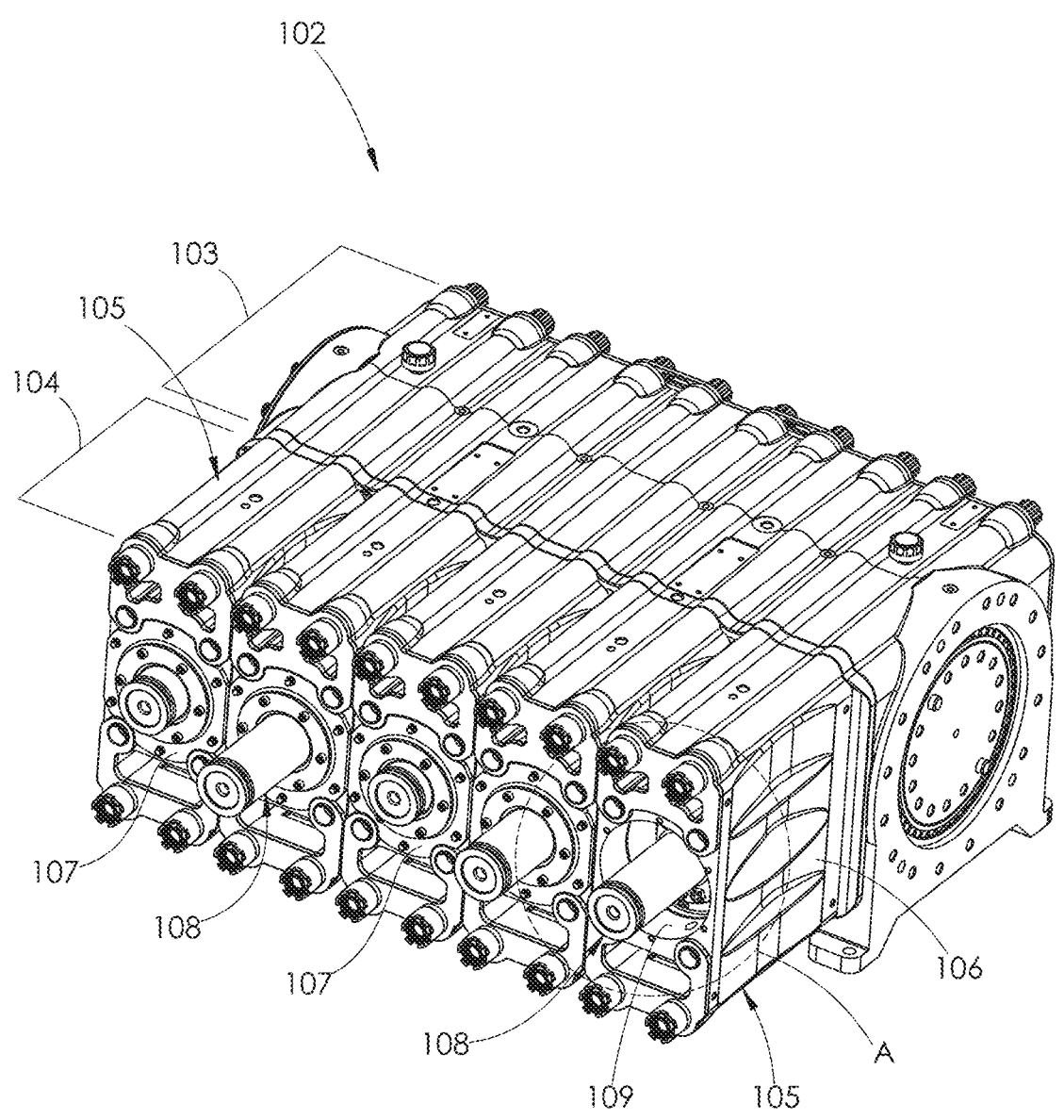
FIG. 2 is a front perspective view of the power end assembly shown in FIG. 1.
Figure 3:
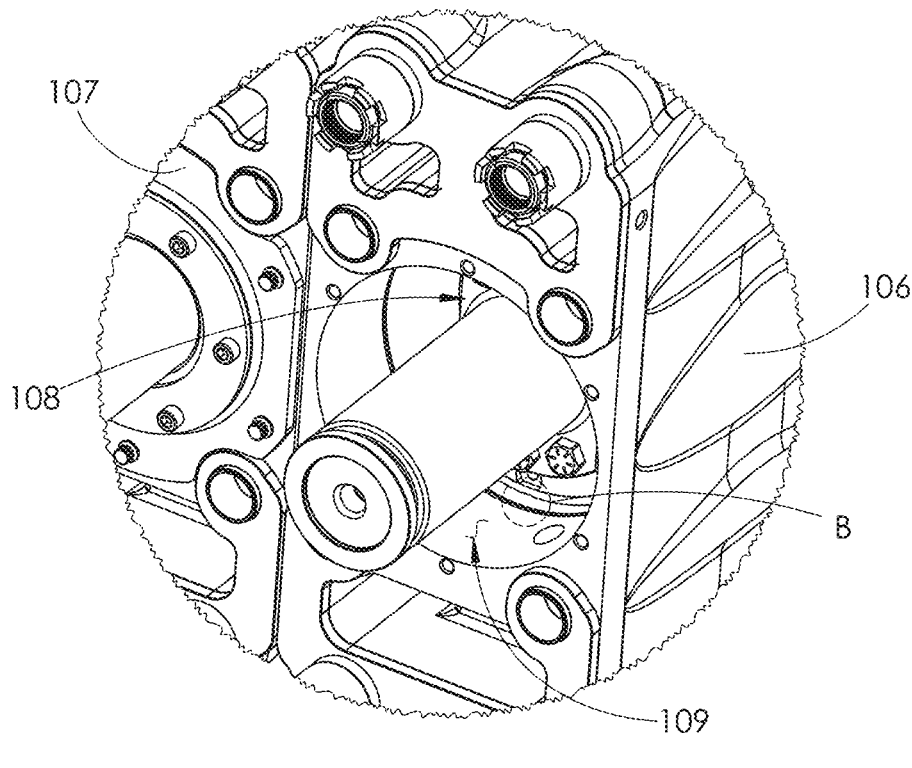
FIG. 3 is an enlarged view of area A, shown in FIG. 2.
Figure 9:
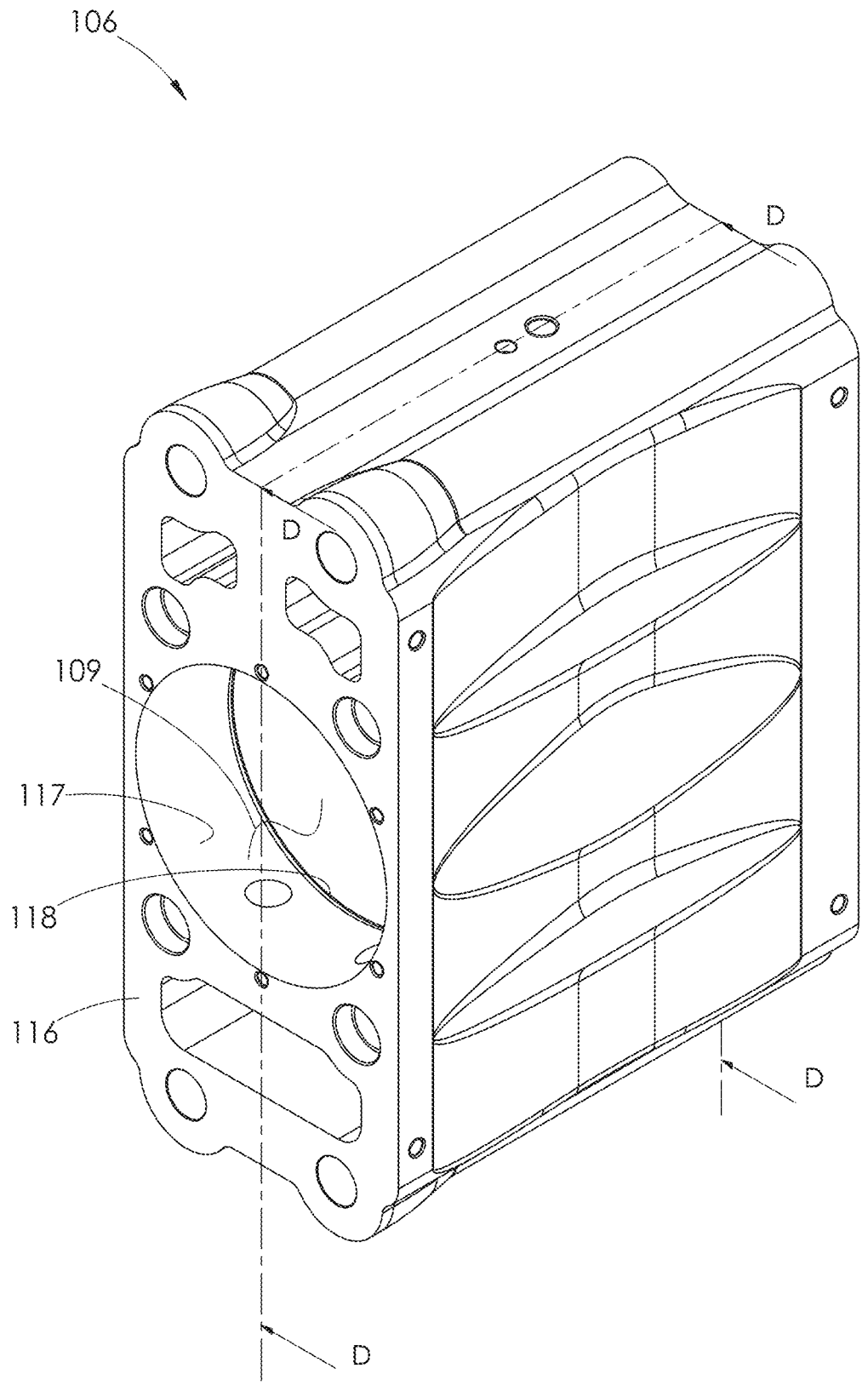
FIG. 9 is a front perspective view of one of the crosshead guides used within the power end assembly shown in FIG. 2.
Figure 10:
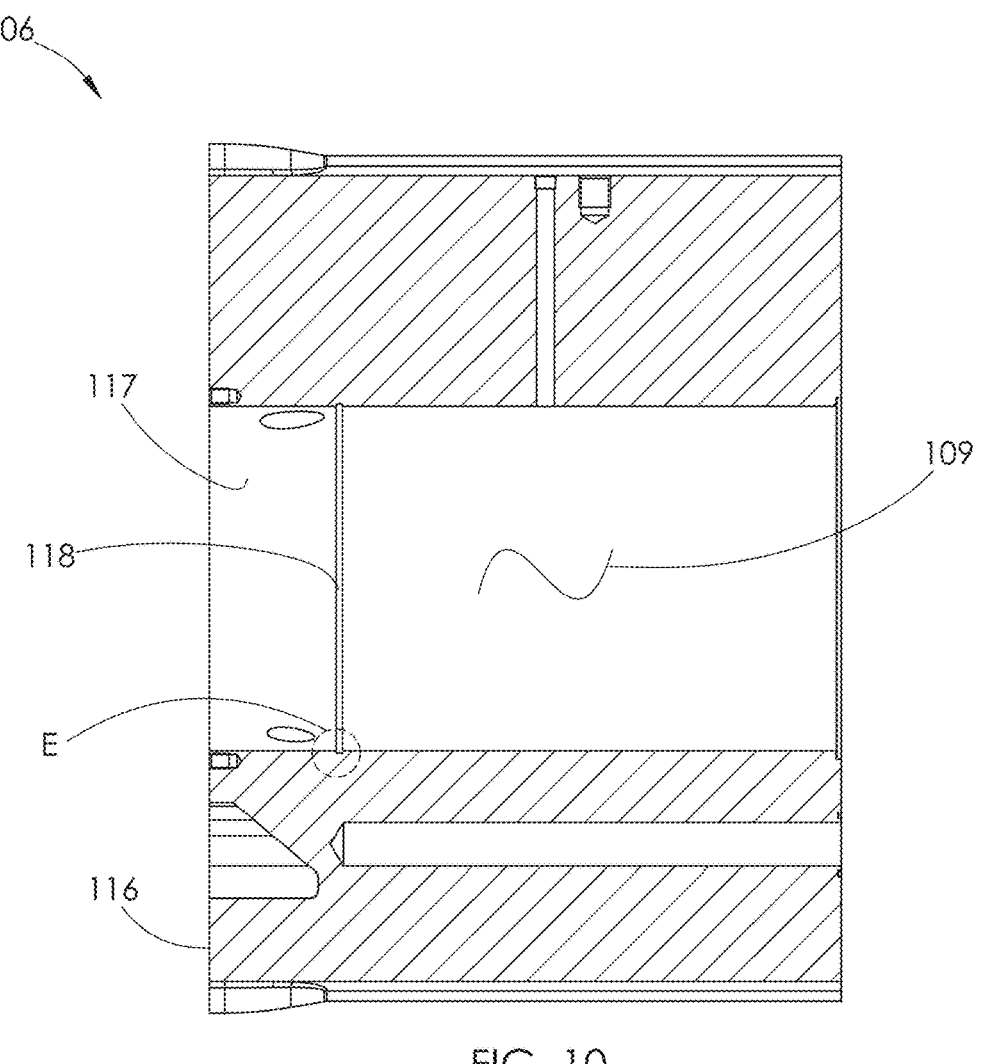
FIG. 10 is a cross-sectional view of the crosshead guide shown in FIG. 9, taken along line D-D.

2 comprises a fluid end assembly 101 attached to a power end assembly 102 as shown in FIG. 1. The power end assembly 102, shown in FIG. 2, comprises a crank section 103 joined to a crosshead section 104. Continuing with FIG. 2, the crosshead section 104 comprises a plurality of crosshead guide assemblies 105 situated in a side-by-side relationship. Each crosshead guide assembly 105 comprises a crosshead guide 106, a pony rod cover 107, and a linear drive assembly 108. A crosshead bore 109 is formed within each crosshead guide 106, as shown in FIGS. 9-10, and each crosshead bore 109 is sized to receive a portion of a linear drive assembly 108 which includes a crosshead, as shown in FIGS. 2-3. Continuing with FIGS. 5-8, the linear drive assembly 108 comprises a plurality of wear plates 110 and a plurality of wear plate fasteners 111.

One such high-pressure pump 100 is disclosed in U.S. Pat. No. 11,953,000, issued to Foster et al., the entire contents of which are incorporated herein by reference.

Each crosshead bore 109 and linear drive assembly 108 are configured to allow the operator to easily determine the amount of wear on the crosshead bore 109 and wear plates 110. Knowing the amount of wear on the crosshead bore 109 and/or the wear plates 110 eliminates the need to further disassemble the power end assembly 102 during maintenance to measure the amount of wear on the components thus saving time.

Figure 7:
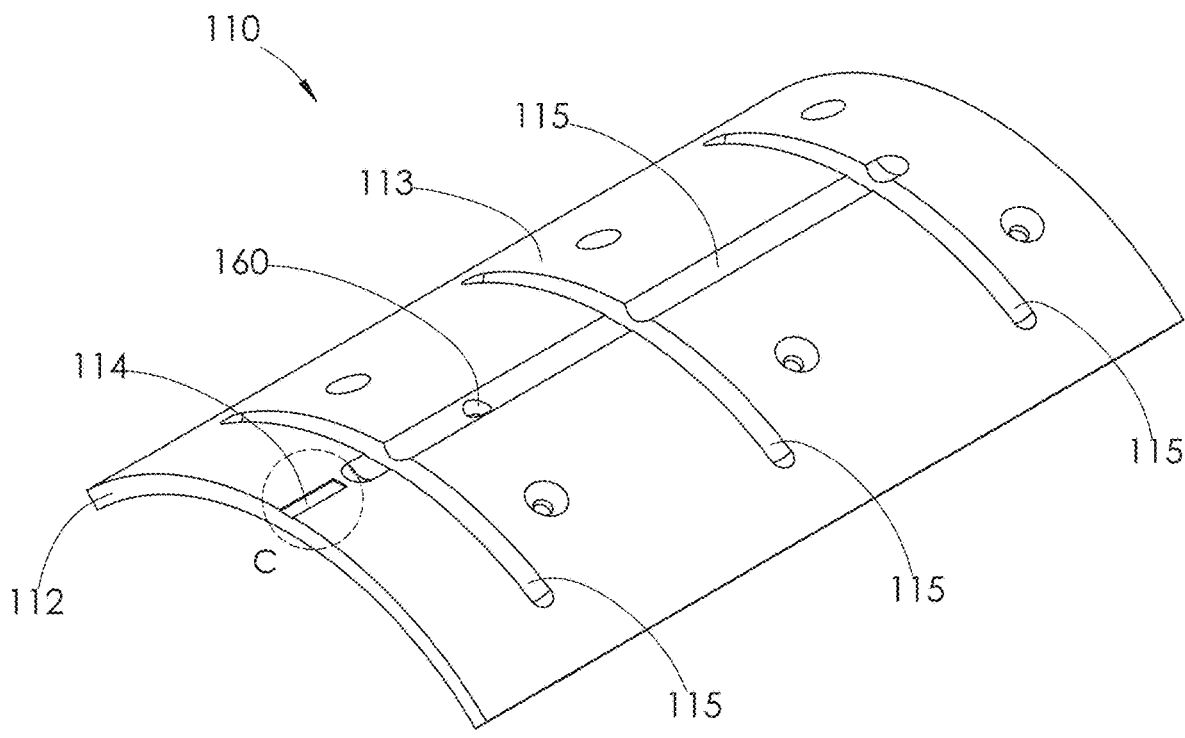
FIG. 7 is a top perspective view of one of the wear plates shown in FIG. 6.
Figure 8:
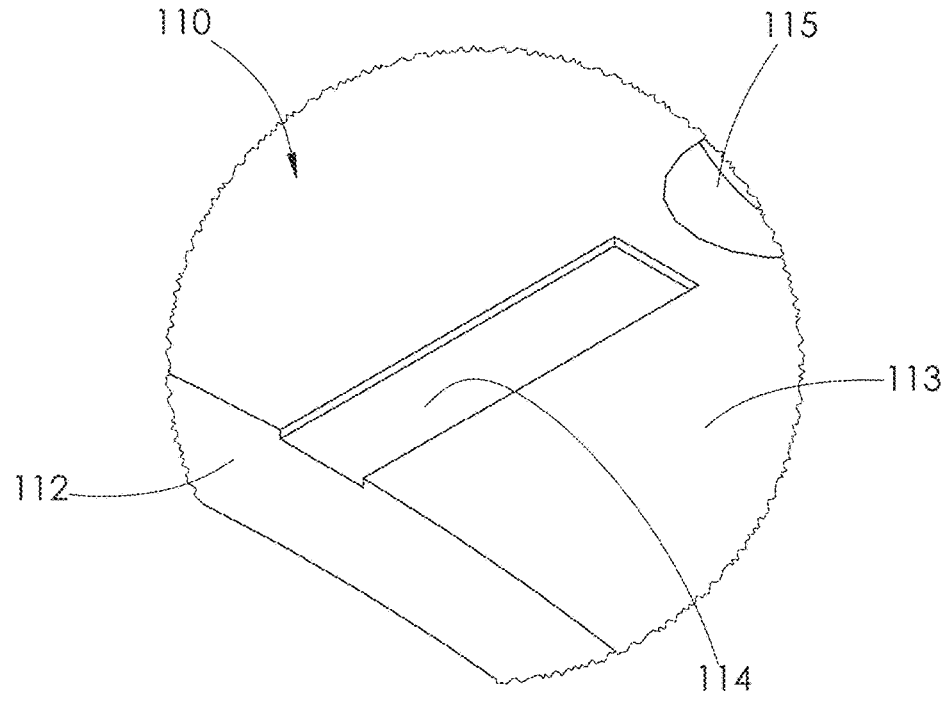
FIG. 8 is an enlarged view of area C, shown in FIG. 7.

Referring now to FIGS. 7-8, a wear plate 110 is shown. The wear plate 110 comprises a front surface 112 and an outer surface 113. The outer surface 113 comprises a wear indicator groove 114 and a plurality of lubrication channels 115. The lubrication channels 115 are formed in the outer surface 113 and have a lubrication port 160 disposed through the wear plate 110. The lubrication port 160 is in fluid communication with a lubrication passage 161 (FIG. 6) formed in the crosshead of the linear drive assembly 108. In this way, lubricant may be distributed from within the linear drive assembly 108 to the lubrication channel 115 of each wear plate 110. As shown, the lubrication channel 115 comprises a longitudinal passage and intersecting radial passages. Thus, the intersecting radial passage may be characterized as "substantially perpendicular" to the longitudinal passage, as it extends substantially at a ninety degree angle relative to the longitudinal passage on the wear plate 110. However, the wear plate 110 may have a curvature, along which the radial path extends.

The wear indicator groove 114 is separate and distinct from the lubrication channels 115. Specifically, the wear indicator groove 114 is not in fluid communication with the lubrication channels 115. The wear indicator groove 114 intersects the front surface 112 so that when the wear plate 110 is viewed from the front the wear indicator groove 114 appears as a notch in the outside radius of the front surface 112, which can be seen in FIG. 4. As shown in this embodiment, the wear indicator groove 114 is located approximately centered on the circumference of the outer surface 113. However, the wear indicator groove 114 may be located anywhere along the circumference of the outer surface 113. Also, the wear indicator groove 114 is shown extending longitudinally perpendicular to the front surface 112. The longitudinal distance is only constrained by the necessity to not intersect any lubrication channel 115. Additionally, the only restriction on circumferential width of the wear indicator groove 114 is that it must be less than the total circumferential length of the outer surface 113 allowing for a visual comparison to determine wear on the wear plate 110. The depth of the wear indicator groove 114 is 0.050 to 0.075 inches but may be larger or smaller.

Figure 11:
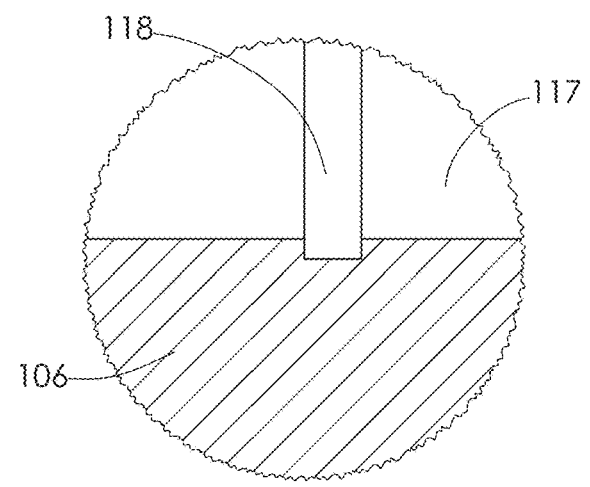
FIG. 11 is an enlarged view of area E, shown in FIG. 10.

Referring now to FIGS. 9-11, a crosshead guide 106 is shown. The crosshead guide 106 comprises a front surface 116 and a crosshead bore 109. The crosshead bore 109 comprises a bore wall 117 and a wear indicator groove 118. The wear indicator groove 118 is formed around the entire circumference of the bore wall 117. The longitudinal position of the wear indicator groove 118 is anywhere between the front surface 116 of the crosshead guide 106 and the location of the front surface 112 of the wear plate 110 when the linear drive assembly 108 is fully retracted. The depth of the wear indicator groove 118 is 0.050 to 0.075 inches but may be larger or smaller.

The wear indicator groove 118 of the crosshead bore 109 may be formed in only a portion of the circumference of the bore wall 117 or there may be a plurality of wear indicator grooves 118 formed in portions of the circumference of the bore wall 117. If a plurality of partially circumferential wear indicator grooves 118 is used they may be spaced longitudinally. There may also be a plurality of fully circumferential wear indicator grooves 118 formed in the bore wall 117 which would be longitudinally spaced. It is also contemplated that one or more wear indicator grooves 118 may be formed in the bore wall 117 parallel to, or at an angle to, the longitudinal axis.

Figure 4:
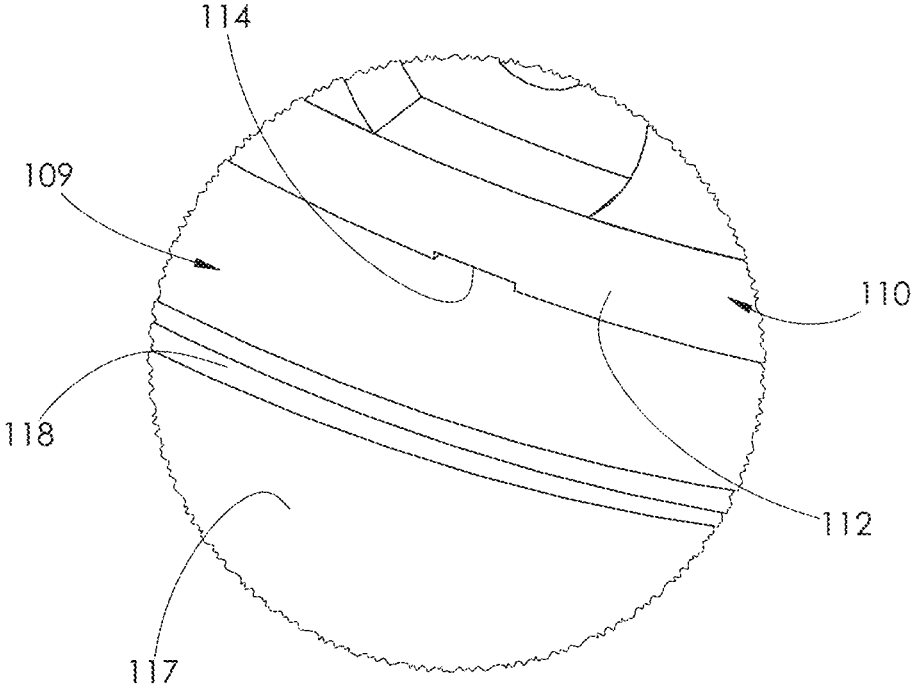
FIG. 4 is an enlarged view of area B, shown in FIG. 3.
Figure 5:
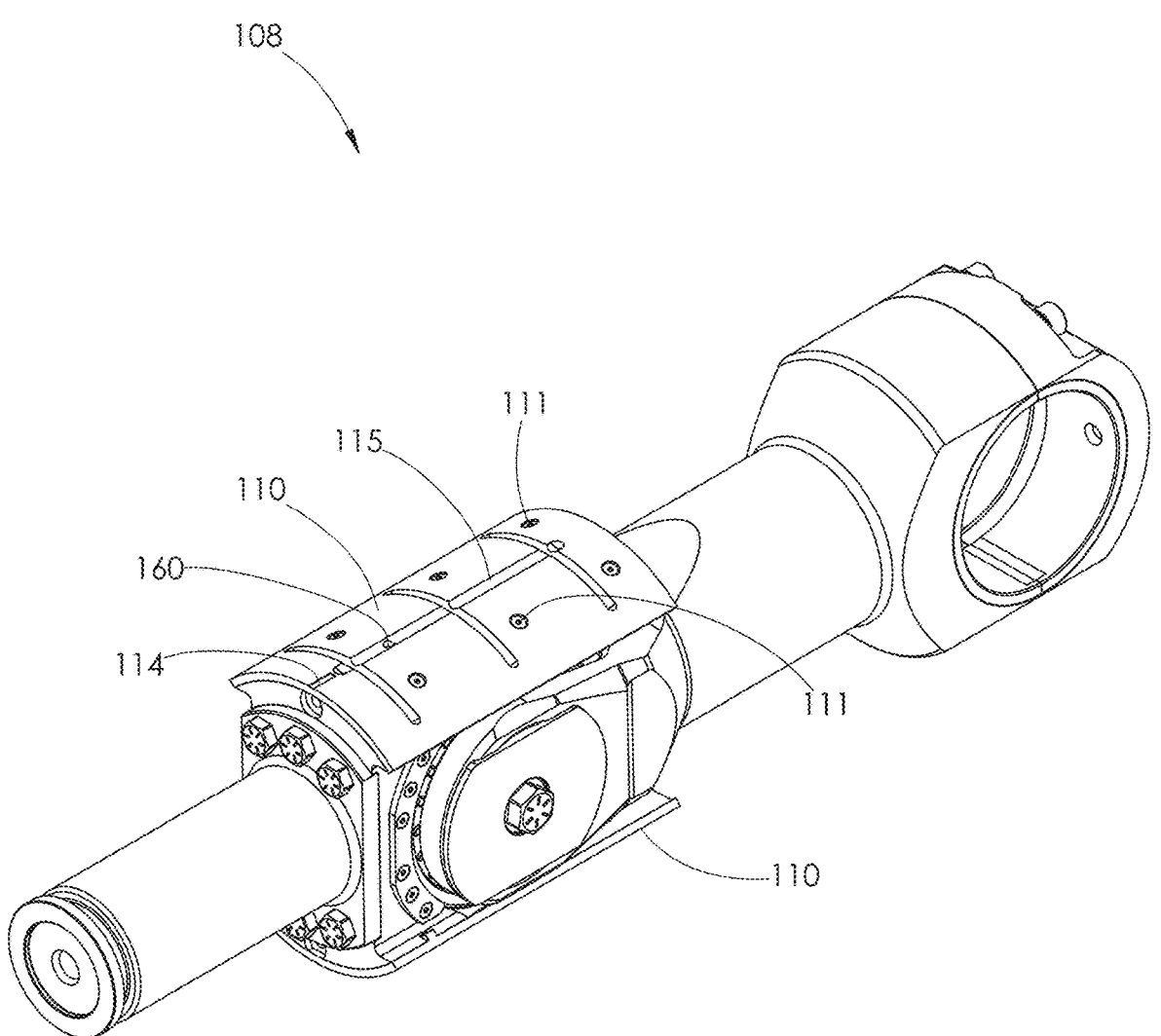
FIG. 5 is a front perspective view of one embodiment of a linear drive assembly disclosed herein.
Figure 6:
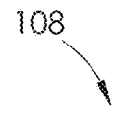
FIG. 6 is a front perspective view of the linear drive assembly shown in FIG. 5 with the wear plate and wear plate fasteners shown exploded from the assembly.

Referring now to FIGS. 2-4, during maintenance operations in which the pony rod cover 107 is removed the operator may visually determine the amount of wear on both the crosshead bore 109 and the wear plates 110. To determine the amount of wear on the wear plates 110 the operator observes the wear indicator groove 114 as shown in FIG. 4. If the wear indicator groove 114 is still observable then the wear plate 110 still has usable life and need not be replaced. If no wear indicator groove 114 can be seen, the wear plate 110 should be replaced or the linear drive assembly 108 flipped. Since it is expected that the operator knows the depth of the wear indicator groove 114 in a new wear plate 110 the depth of the observed wear indicator groove 114 will provide the operator an indication of the approximate remaining life of the wear plate 110. For instance, if the operator observes the depth of the wear indicator groove 114 to be approximately half that of a new one after fifty hours of operation, the operator can assume that the wear plate 110 will provide another fifty hours of operational life and re-check the wear plates 110 at that time.

Continuing with FIGS. 2-4, the amount of wear on the crosshead bore 109 may be determined by operator observation when the pony rod cover 107 is removed. If the operator can still see the wear indicator groove 118 in the crosshead bore 109 then the crosshead guide 106 need not be replaced. As with the wear plate 110 an estimate of remaining life may be made by comparing the observed depth of the wear indicator groove 118 to that of a new one and assuming a linear, or other known, rate of wear.

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only, and changes may be made in detail. Changes may especially be made in matters of structure and arrangements of parts within the principles of the present technology to the full extent indicated by the broad general meaning of the terms in which the appended claims are expressed.

The invention claimed is:

1. A power end assembly, comprising:
a crosshead guide, comprising:
   a bore formed therein;
   an inwardly facing wall; and
   a wear indicator groove formed in the inwardly facing wall;
a linear drive assembly configured to be installed within the bore, the linear drive assembly comprising:
   a crosshead comprising opposed first and second surfaces;
   a pair of wear plates, each wear plate removably attached to a corresponding one of the first and second surfaces of the crosshead, each wear plate having an outer surface and a front edge and comprising:
      at least one lubricant groove formed in the outer surface, the at least one lubricant groove in fluid communication with a lubrication passage formed in the crosshead; and
      at least one wear plate groove formed in the outer surface, the at least one wear plate groove not in fluid communication with the lubrication passage formed in the crosshead or with the at least one lubricant groove;
      in which the at least one wear plate groove opens on the front edge of the wear plate;
    in which each wear plate is configured to engage both the crosshead and the inwardly facing wall of the crosshead guide; and
    in which the wear indicator groove is observable when the linear drive assembly is installed within the bore.

2. The power end assembly of claim 1, in which the at least one wear plate groove is observable when the linear drive assembly is installed within the bore.

3. The power end assembly of claim 1, in which the at least one wear plate groove has a depth of between 0.050 to 0.075 inches.

4. A power end assembly, comprising:
a crankshaft frame;
a crosshead guide, comprising:
   a body having a bore formed therein, the bore defining a bore wall; and
   a wear indicator groove formed in the bore wall;
   in which the wear indicator groove is visible when the crosshead and wear plate are situated within the bore; and
   in which the body is configured to be attached to the crankshaft frame via a plurality of stay rods;
a crosshead configured to be situated within the bore; and
a wear plate removably attached to the crosshead, the wear plate comprising:
   an outer surface, comprising:
      a plurality of lubrication channels formed therein; and
      a wear plate groove formed separate from the plurality of lubrication channels;
   an inner surface configured to engage an external surface of the crosshead; and
   a plurality of openings formed therein, the plurality of openings extending through the inner surface and the outer surface and configured to receive a plurality of wear plate fasteners;
   in which the outer surface of the wear plate is configured to engage the bore wall.

5. The power end assembly of claim 4, in which the wear plate further comprises a front surface; in which the wear plate groove intersects the front surface.

6. The power end assembly of claim 4, in which the wear plate groove is visible when the crosshead is situated within the bore.

7. The power end assembly of claim 4, in which the bore wall comprises a wear indicator groove formed therein.

8. The power end assembly of claim 7, in which the wear indicator groove is circumferential.

9. The power end assembly of claim 4, in which the wear plate further comprises a lubrication port disposed through the wear plate; in which the lubrication port is in fluid communication with a lubrication passage formed in the crosshead.

10. The power end assembly of claim 9, in which the lubrication port is in fluid communication with the plurality of lubrication channels, but not with the wear plate groove.

11. The power end assembly of claim 9, in which the lubrication passage is in fluid communication with the plurality of lubrication channels.

12. A power end assembly, comprising:
a crankshaft frame;
a crosshead guide, comprising:
    a bore formed therein, the bore comprising a bore wall having a wear indicator groove formed therein;
    in which the crosshead guide is attached to the crankshaft frame via a plurality of stay rods;
a crosshead configured to be situated within the bore; and
a wear plate removably attached to the crosshead, the wear plate comprising:
    an outer surface comprising a plurality of lubrication channels formed therein;

an inner surface configured to engage an external surface of the crosshead; and
    a plurality of openings formed therein, the plurality of openings extending through the inner surface and the outer surface and configured to receive a plurality of wear plate fasteners;
    in which the outer surface of the wear plate is configured to engage the bore wall;
    in which the wear indicator groove is observable when the wear plate is attached to the crosshead and the crosshead is situated within the bore.

13. The power end assembly of claim 12, in which the wear plate further comprises:
a wear plate groove formed in the outer surface;
in which the wear plate groove is not in fluid communication with the plurality of lubrication channels.

14. The power end assembly of claim 13, in which the wear plate groove is observable when the crosshead is situated within the bore.

15. The power end assembly of claim 12, further comprising:
a pony rod cover removably attached to the crosshead guide;
in which the wear indicator groove is not observable when the pony rod cover is attached to the crosshead guide.

16. The power end assembly of claim 12, in which the wear indicator groove is circumferential.

17. The power end assembly of claim 12, in which the wear indicator groove has a depth of between 0.050 and 0.075 inches.

* * * * *